(12) United States Patent
Banaei et al.

(10) Patent No.: US 9,791,723 B2
(45) Date of Patent: Oct. 17, 2017

(54) METHOD OF POLING AND CALIBRATION OF ELECTRO-OPTIC FIBERS

(71) Applicant: Flex Optronix Technologies, LLC, Orlando, FL (US)

(72) Inventors: Esmaeil Banaei, Orlando, FL (US); Mohammad Umar Piracha, Orlando, FL (US)

(73) Assignee: FLEX OPTRONIX TECHNOLOGIES, LLC, Orlando, FL (US)

( * ) Notice: Subject to any disclaimer, the term of this patent is extended or adjusted under 35 U.S.C. 154(b) by 125 days.

(21) Appl. No.: 14/803,796

(22) Filed: Jul. 20, 2015

(65) Prior Publication Data

US 2016/0018674 A1    Jan. 21, 2016

Related U.S. Application Data

(60) Provisional application No. 62/026,444, filed on Jul. 18, 2014.

(51) Int. Cl.
*H04B 17/00* (2015.01)
*G02F 1/065* (2006.01)
*G02F 1/225* (2006.01)
*G02F 1/355* (2006.01)

(52) U.S. Cl.
CPC ............ *G02F 1/065* (2013.01); *G02F 1/225* (2013.01); *G02F 1/3558* (2013.01)

(58) Field of Classification Search
CPC ......... G02F 1/065; G02F 1/225; G02F 1/3558
See application file for complete search history.

(56) References Cited

U.S. PATENT DOCUMENTS

| | | | | |
|---|---|---|---|---|
| 5,082,349 | A * | 1/1992 | Cordova-Plaza | G02F 1/3775 385/16 |
| 6,072,930 | A * | 6/2000 | Kornreich | G02F 1/0955 385/123 |
| 6,259,830 | B1 * | 7/2001 | Bhagavatula | C03B 37/026 385/11 |
| 7,317,847 | B1 * | 1/2008 | Wang | G02B 6/024 385/122 |
| 2002/0119400 | A1 * | 8/2002 | Jain | G02B 6/29322 430/321 |
| 2003/0198447 | A1 * | 10/2003 | Kim | G02F 1/3558 385/123 |
| 2006/0072875 | A1 * | 4/2006 | Bhagavatula | G02B 6/12007 385/30 |
| 2011/0103756 | A1 * | 5/2011 | Rice | C03B 37/0235 385/123 |

* cited by examiner

*Primary Examiner* — Tesfaldet Bocure
(74) *Attorney, Agent, or Firm* — Brinks Gilson & Lione

(57) ABSTRACT

A method of poling and calibrating electro-optic fibers is disclosed. Metal electrodes are used to utilize the electro-optic effect to impart phase delays to the optical signal. Moreover, one or more electrodes may be used for heating of the device to reach softening temperatures of the electro-optic material, which allows easy, effective and efficient poling of the electro-optic material. A method based on continuous or periodic optical feedback is used to automatically calibrate the electro-optic device when its performance degrades with time to relaxation of molecular orientations.

18 Claims, 4 Drawing Sheets

METHOD OF POLING AND CALIBRATION OF ELECTRO-OPTIC FIBERS

CROSS REFERENCE TO RELATED APPLICATIONS

This application claims the benefit of U.S. Provisional Application Ser. No. 62/026,444, filed Jul. 18, 2014, the disclosure of which is hereby incorporated by reference in its entirety.

FIELD OF THE DISCLOSURE

The present disclosure relates generally to electro-optic modulation, optical fibers, optical interference, and the poling process.

BACKGROUND OF THE DISCLOSURE

In one configuration, Electro-optic modulator (EOM) is a signal-controlled Mach-Zehnder interferometer generating ultra-fast optical signals over optical fiber communication systems. In such an EOM, the input continuous optical wave is split in two halves at a 3 dB Y waveguide branch. Optical wave in each branch experiences a phase change. The two branches will then be connected and recombined using a second Y-shaped waveguide branch. At the output Y waveguide branch two split waves are recollected, so that if two split guided waves are in-phase, they will constructively interfere resulting in the on-state in the optical switch (or modulator). While in 180° phase difference the destructive interference leads to the off-state. A signal-controlled electro-optic material imbedded in one of the two branches is responsible for enforcing phase difference in the interferometer.

Three types of nonlinear electro-optic materials may be used as the switching component of the EOMs; Lithium Niobate (LiNbO3), Gallium Arsenide (GaAs), and Indium Phosphide (InP). Recently organic chromophore-doped polymers have been implemented as the switching component, due to their cost-effective production process and their faster electro-optic effect. Despite dazzling progress in EOMs, they have tremendously high loss (4~9 dB) as a result of their unavoidable waveguide loss and mismatch between on-chip waveguides and external optical fibers. Furthermore, due to complicated engineering process of gigabit-speed modulators, they failed to be cost-effectively manufactured, particularly those composed of more than one Mach-Zehnder interferometer.

SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later.

In one embodiment of an electro-optic polymer fiber, disclosed herein, the fiber may include a core for passing light there through, a first electrode spaced from the core and oriented substantially parallel with the core, a second electrode spaced from the core and oriented substantially parallel with the core and the first electrode, the first and second electrodes spaced each spaced substantially the same distance from the core, the first and second electrodes defining a pair of electrodes, a third electrode spaced from the core and oriented substantially parallel with the core, a fourth electrode spaced from the core and oriented substantially parallel with the core and the third electrode, the third and fourth electrodes spaced each spaced substantially the same distance from the core, the third and fourth electrodes defining an additional pair of electrodes, and a cladding material substantially surrounding at least a portion of the core, pair of electrodes, and additional pair of electrodes.

An embodiment of a method of controlling optical signals in an electro-optic polymer fiber, where the fiber includes a core for passing the optical signal there through, a first pair of electrodes, and a second pair of electrodes, may include adjusting voltage through the first pair of electrodes in order to adjust an electrical field for poling, and varying current through the second pair of electrodes in order to create localized heating in the fiber.

An embodiment of a method of automatically calibrating optical signals passing through an electro-optic polymer fiber, where the fiber including a core for passing the optical signal there through, a first pair of electrodes, and a second pair of electrodes, may include measuring characteristics of the outputted light; and if the characteristics of the outputted light are below a minimum level, then performing at least one adjustment of adjusting voltage through the first pair of electrodes in order to adjust an electrical field for poling, and/or varying current through the second pair of electrodes in order to create localized heating in the fiber.

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents. Other advantages and novel features will become apparent from the following description when considered in conjunction with the drawings.

DETAILED DESCRIPTION

Figure 1:
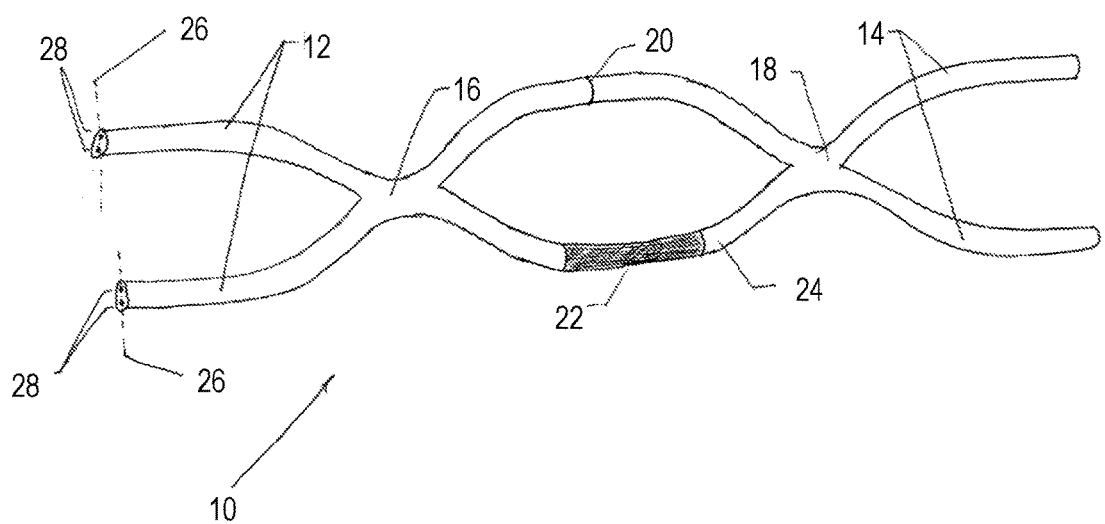
FIG. 1 illustrates a perspective view of an embodiment of an all-fiber electro-optic modulator.

The following detailed description and the appended drawings describe and illustrate some embodiments of the disclosure for the purpose of enabling one of ordinary skill in the relevant art to make and use these embodiments. As such, the detailed description and illustration of these embodiments are purely illustrative in nature and are in no way intended to limit the scope of the disclosure in any manner. It should also be understood that the drawings are not necessarily to scale and in certain instances details may have been omitted, which are not necessary for an understanding of the embodiments, such as details of fabrication and assembly. In the accompanying drawings, like numerals represent like components.

In one embodiment of an electro-optic polymer fiber, disclosed herein, the fiber may include a core for passing light there through, a first electrode spaced from the core and oriented substantially parallel with the core, a second electrode spaced from the core and oriented substantially parallel with the core and the first electrode, the first and second electrodes spaced each spaced substantially the same distance from the core, the first and second electrodes defining a pair of electrodes, a third electrode spaced from the core and oriented substantially parallel with the core, a fourth electrode spaced from the core and oriented substantially parallel with the core and the third electrode, the third and fourth electrodes spaced each spaced substantially the same distance from the core, the third and fourth electrodes defining an additional pair of electrodes, and a cladding material substantially surrounding at least a portion of the core, pair of electrodes, and additional pair of electrodes.

In further embodiments of an electro-optic polymer fiber, the core may be doped with chromophore. A poling axis may be defined as extending from the first electrode to the second electrode, through the core, and the polarization of light passing through the core is parallel with the poling axis. The fiber may further include a first metal plate electrically connected with the first pair of electrodes, the first metal plate operable to provide an electric driving signal to the first pair of electrodes, and a second metal plate electrically connected with the second pair of electrodes, the second metal plate operable to provide an electric driving signal to the second pair of electrodes. The first metal plate and second metal plate may be independently operable to control the voltage in the first set of electrodes and the current through the second pair of electrodes. The first pair of electrodes may operate in a capacitive mode to apply voltage to the core to induce a phase-shift of light passing through the core. The second pair of electrodes may operate in a resistive mode to generate heat as current is passed through the second pair of electrodes. The fiber may further include a feedback system, which may include a measurement sensor positioned to measure light outputted from the core, and a control system operable to independently control the voltage change between the first set of electrodes and the current passing through the second pair of electrodes. The feedback system may be automated such that if measurable characteristics of the outputted light fall below a minimal threshold, then the feedback system automatically adjusts the voltage in the first set of electrodes and/or the current in the second set of electrodes in order to improve the characteristics of the outputted light. The measurable characteristics of the outputted light may include the intensity of the light as a measure of the phase shift that manifests itself through light interference.

An embodiment of a method of controlling optical signals in an electro-optic polymer fiber, where the fiber includes a core for passing the optical signal there through, a first pair of electrodes, and a second pair of electrodes, may include adjusting voltage through the first pair of electrodes in order to adjust an electrical field for poling, and varying current through the second pair of electrodes in order to create localized heating in the fiber.

An embodiment of a method of automatically calibrating optical signals passing through an electro-optic polymer fiber, where the fiber including a core for passing the optical signal there through, a first pair of electrodes, and a second pair of electrodes, may include measuring characteristics of the outputted light; and if the characteristics of the outputted light are below a minimum level, then performing at least one adjustment of adjusting voltage through the first pair of electrodes in order to adjust an electrical field for poling, and/or varying current through the second pair of electrodes in order to create localized heating in the fiber.

Embodiments of the disclosure include methods for conveniently poling an electro-optic material inside an optical fiber using electrodes that are embedded within the optical fiber. The poling method may include self-calibration. This may be performed by periodically observing the V-pi voltage of the electro-optic fiber, and if degradation is observed, then electrodes may be used as heating elements to elevate temperature to reach the softening temperature of the electro-optic material or the host polymer, and a bias may be applied to another set of electrodes to generate an electric field that re-orients the electro-optic molecules. Different configurations (utilizing parameters not limited to the shape, number and location of optical cores, metal cores, and electrodes) may be used to engineer devices for specific applications.

A microcontroller/microprocessor or computer can be connected to the device to develop a feedback loop such that whenever the electro-optic performance falls below spec, the calibration process can be automatically triggered. The performance of the device can be periodically checked by measuring the phase change in the optical signal passing through the electro-optic fiber. The phase change can be measured by interferometric techniques, not limited to those utilizing Mach Zehnder Interferometers, or by using other measurement devices and/or principles.

Figure 2:
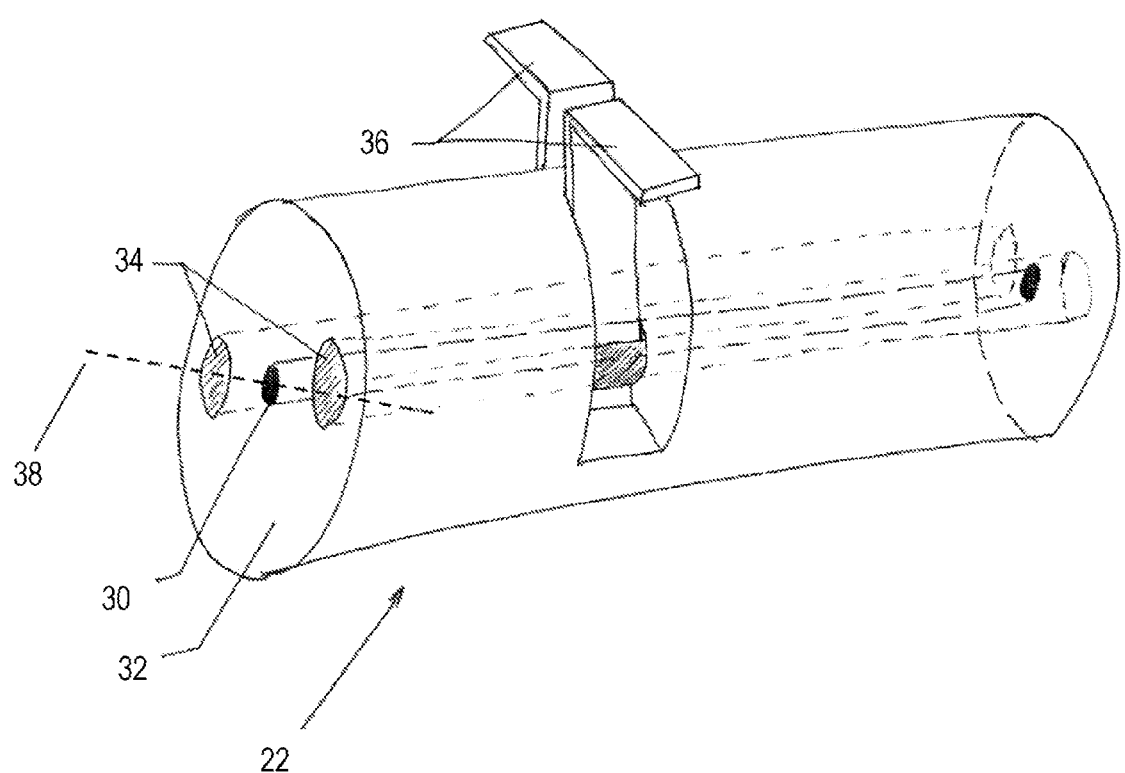
FIG. 2 illustrates a perspective view of an embodiment of an electro-optic polymer fiber.

As described in the disclosure herein, and illustrated in FIG. 2, an electro optic fiber may be produced with the chromophore-doped electro-optic polymer fiber 22 and may be composed of a chromophore-doped core 30, and cladding 32, along with a pair of electrodes 34 placed in parallel on sides of the core 30. Electric driving signals may be applied through two plates 36 which are connected to electrodes 34. In this embodiment, the polarization of the inserted light may be parallel to the poling axis 38 of the chromophore-doped electro-optic polymer fiber 22. Therefore, the effective refractive index of the guided mode is changed by varying driving voltage of the electrodes 34. Furthermore, the core 30 material of the polymer fiber 22 may be Polystyrene (PS) or poly methyl methacrylate (PMMA) doped with a nonlinear electro-optic chromophore such as Disperse Red 1. The cladding 32 may be made of poly methyl methacrylate (PMMA). The electrodes 34 can be metallic micro wires such as copper wires, or transparent conductors such as Indium Tin Oxide (ITO).

An all-fiber EOM is described in FIG. 1 for providing low optical loss and high speed response. The device may include a fiber Mach-Zehnder interferometer along with a chromophore-doped polymer optical fiber placed on one arm of the interferometer. The specialty chromophore-doped polymer optical fiber may be the electro-optic component of the device which is discussed in U.S. patent application Ser. No. 14/187,492 and PCT App. No. PCT/US14/17922, the entire contents of each are herein incorporated in their entirety.

With reference to FIG. 1, an EOM 10 may be formed by two strands of a polarization maintaining fiber (PMF) 12, and two strands of a single mode fiber (SMF) 14. The PMFs and SMFs may be joined at a first 16 and second coupler 18, respectively. A first interfering arm 20 of the EOM 10 may be formed by joining the end-facet of the SMF 14 and that of the PMF 12. A certain length of a chromophore-doped electro-optic polymer fiber 22 imbedded in the second arm 24 may be butt-coupled to the end-facet of the PMF 12 and that of the SMF 14.

Furthermore, a linear polarized light whose polarization is parallel to the slow axis 26 of the PMF 12, may be inserted in to one of two strands of the PMF 12. The slow axis 26 is, for instance, an imaginary line crossing the stress rods 28 of the PMF 12. The light can be split at the first 3 dB coupler 16 leading to separation of two linear polarized waves with the same intensity. One polarized wave in the arm 20 may directly reach the coupler 18, while the second split wave is phase-retarded in the arm 24 by the chromophore-doped electro-optic polymer fiber 22. Both phase-retarded and directly guided waves may be recombined at the second 3 dB coupler 18. The constructive and destructive interference of two recombined waves results in the on-state and the off-state optical signal, respectively.

The length of the first 20 and the second 24 arm may be, in one embodiment, about 50 mm to 100 mm and the length of the chromophore-doped electro-optic polymer fiber 22 varies from 1 cm to 20 cm. The longer the length of the polymer fiber 22, the lower the driving voltage is needed to switch from the off-state to the on-state. The chromophore-doped electro-optic polymer fiber 22 can be single-mode, multi-mode or polarization maintaining polymer fiber.

The construction details of the embodiment illustrated in FIG. 1 are that the SMF 14 may be a commercial single mode optical fiber such as Corning 28, and commercially available fibers such as F-PM1550 can be used as PMF 12. The chromophore-doped electro-optic polymer fiber 22 may be fabricated using the technique disclosed comprehensively in the U.S. patent application Ser. No. 14/187,492, the entire contents of which are herein incorporated by reference.

Figure 3:
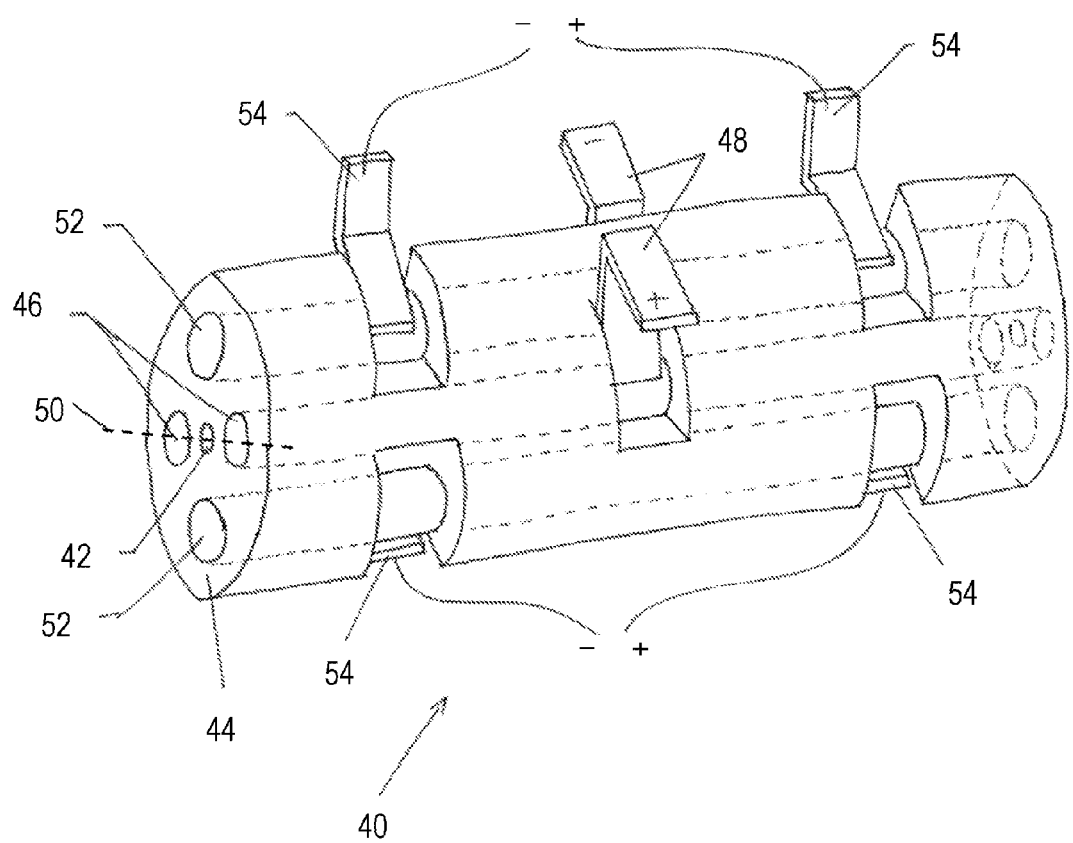
FIG. 3 illustrates a perspective view of an embodiment of an electro-optic polymer fiber with resistive electrodes for self-heating and self-calibration.

With reference now to FIG. 3, the chromophore-doped electro-optic polymer fiber 40 may be composed of a chromophore-doped core 42, and cladding 44, along with a pair of electrodes 46 placed in parallel on sides of the core 42. The chromophore-doped electro-optic polymer fiber 40 can include additional metal electrodes 52 for local heating and softening of the chromophore-doped core 42. Electric driving signals are applied through plates 48 and 54 which are connected to electrodes 46 and 52 respectively. The polarization of the inserted light may be parallel to the poling axis 50 of the chromophore-doped electro-optic polymer fiber 40. Chromophore-doped waveguides can relax their poling over time. This relaxation of poling causes change in electro-optic performance and induced phase-shift with a given applied voltage. In some embodiments, metal electrodes 46 are used in capacitive mode to apply voltage to the chromophore-doped core 42 for phase-change induction, and the additional electrodes 52 are used in resistive mode to allow a controllable current through them in order to generate local heating in fiber 40 in vicinity of the doped core 42. Generated heat can allow local softening and, therefore, easier poling of the materials in the chromophore-doped core 42 by applying a voltage between the capacitive metal electrodes 52. While maintaining the voltage between the capacitive metal electrodes 46, the electric current in the resistive metal wires 52 can be gradually lowered to gradually reduce the temperature of the chromophore-doped core 42 and fix chromophore orientations by solidifying the core material.

In further embodiments, the chromophore-doped electro-optic polymer fiber 40 can include a feed-back system that provides feedback on the performance of chromophore-doped electro-optic polymer fiber 40 (for example, by measuring the intensity of output light as a measure of the phase shift that manifests itself through light interference). The feedback system may include a known or to be developed measurement device for measuring characteristics of the outputted light, as well as a control system for controlling current through resistive wires 52 and voltage between the capacitive electrodes 46. For instance, this feedback can trigger a current through the resistive wires 52 and a voltage between the capacitive electrodes 46 in order to restore a desired poling in the chromophore-doped core material. This self-calibration process can be adjusted for frequent calibration and maintenance of the electro-optic device when its performance level drops below a defined threshold level.

Metal contacts shown, for instance, in FIGS. 2 and 3 are for demonstration only. Embodiments of the disclosure may include any contact configuration either from the sides or from the ends of the electro-optic fiber.

A method of poling electro optical material in an optical fiber may, accordingly, use electrodes that are directly inserted in the optical fiber during the fiber fabrication or fiber draw process. These electrodes may be used for generating an electrical field for poling, and/or for creating localized heating in the fiber structure to reach a softening temperature suitable for poling the electro-optic fiber. A method of automatically calibrating the electro-optic section of the electro-optic fiber may be accomplished by using an optical signal that is transmitted through the device and the electro-optic response of the fiber may be characterized by measuring the phase retardation as a function of voltage applied to the electrodes. The calibration method may be used to periodically check the electro-optic response of the device, and a poor response may trigger a poling (or calibration) event that may or may not utilize a feedback and/or a device such as a microcontroller/computer/etc. The method of calibrating may utilize an interferometric approach to characterize the electro-optic response of the device, not limited to configurations such as Mach Zehnder Interferometer, Fabry Perot Etalon, Michelson Interferometer, etc. One, or more electrodes may be used as heating elements, and/or one or more electrodes are used to generating an electric field profile across the material to be polled. The electro-optic device may consist of chromophore doped core, or cladding, or both, or a different electro-optic material, and/or doping, for example. Any optical waveguides may be used and are not limited to embodiments developed using single mode or multimode fibers. The device design may be optimized for certain features, not limited to poling, or electro-optic affect, or both, for example, by modifying parameters not limited to electrode shape, electrode size, number of electrodes, spacing of electrodes, voltages applied, material of electrode, material of fiber, waveguide dopants, etc. The performance of the device may be checked periodically or continuously in the course of its operation.

Figure 4:
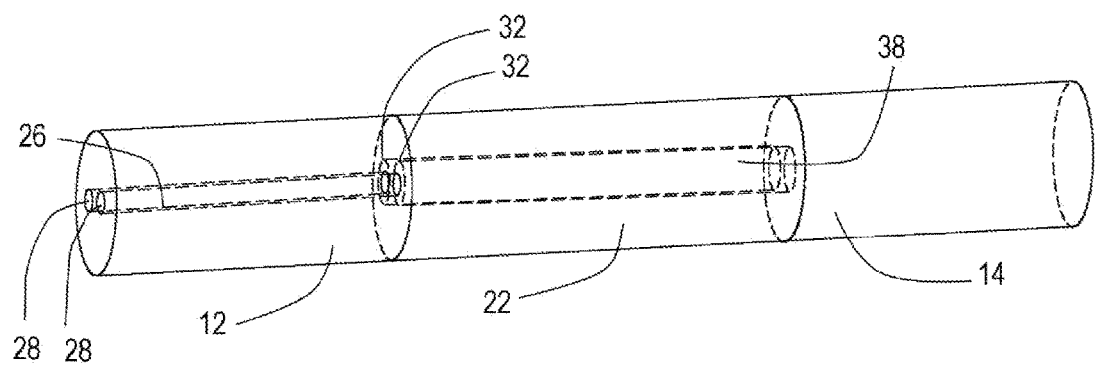
FIG. 4 illustrates a perspective view of an embodiment of an interferometer arm.

FIG. 4 illustrates a chromophore-doped electro-optic polymer fiber 22 which may be coupled to a PMF 12 and a SMF 14. The slow axis 26 may be parallel to the poling axis 38, thereby indicating that phase retardation occurs perfectly if the polarization of the incident light is along the slow axis 26 of the PMF 12. Alternatively, the poling axis 38 can be perpendicular to the slow axis 26 of the PMF 12 which in this case the polarization of the incident light would be perpendicular to the slow axis of the PMF 12. The chromophore-doped electro-optic polymer fiber 22 may be joined to PMF 12 and SMF 14 using an epoxy.

Embodiments of the disclosure may result in higher optical power efficiency, simplicity, and lower production cost compared to conventional EOMs. Additionally, EOM can be fabricated using cost-effective techniques rather than complicated costly engineering techniques such as lithography. Furthermore, embodiments of the disclosure may provide high potential of mass-production, since all components are basically manufactured using the accurate fast fiber optic drawing technique.

The EOM market gap is that quadrature amplitude modulators (QAMs) composed of more than one Mach-Zehnder modulator are expensive. At the same time, the individual Mach-Zehnder interferometers cannot be integrated on one single optical chip leaving a big challenge of expensive fabrication cost and the challenge of precise phase control of the QAMs. The phase of the QAMs would be easier to control if the Mach-Zehnder interferometers were integrated on one optical chip. Embodiments disclosed may enable integration of many Mach-Zehnder interferometers with drastically lower production costs and lower loss.

The descriptions set forth above are meant to be illustrative and not limiting. Various modifications of the embodiments, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the embodiments in many other ways, using equivalents and alternatives that do not depart from the scope of the disclosure. Moreover, unless indicated to the contrary in the preceding description, none of the components described in the implementations are essential to the embodiments disclosed. It is thus intended that the embodiments be considered as illustrative, with a true scope and spirit of the disclosure being indicated by the following claims.

What is claimed is:

1. An electro-optic fiber comprising:
a core for passing light there through;
a first electrode spaced from the core and oriented substantially parallel with the core, the first electrode defining an electrode group;
a second electrode spaced from the core and oriented substantially parallel with the core, the second electrode defining an additional electrode group;
a cladding material substantially surrounding at least a portion of the core, the electrode group, and the additional electrode group;
a first metal plate electrically connected with the electrode group, the first metal plate operable to provide an electric driving signal to the electrode group; and
a second metal plate electrically connected with the additional electrode group, the second metal plate operable to provide an electric driving signal to the additional electrode group.

2. The electro-optic fiber of claim 1, wherein the core is doped with chromophore.

3. The electro-optic fiber of claim 1, wherein the core is doped with inorganic material.

4. The electro-optic fiber of claim 1 further comprising a third electrode spaced from the core and oriented substantially parallel with the core and the first electrode, the electrode group further defined by the first electrode and the third electrode; and
a fourth electrode spaced from the core and oriented substantially parallel with the core and the second electrode, the additional electrode group further defined by the second electrode and the fourth electrode.

5. The electro-optic fiber of claim 4, wherein a poling axis is defined as extending from the first electrode to the third electrode, through the core, and
wherein the polarization of light passing through the core is parallel with the poling axis.

6. The electro-optic fiber of claim 4, wherein each electrode of the electrode group is equally spaced from the core.

7. The electro-optic fiber of claim 4, wherein each electrode of the additional electrode group is equally spaced from the core.

8. The electro-optic fiber of claim 1, wherein the first metal plate and second metal plate are independently operable to control the voltage in the electrode group and the current through the additional electrode group.

9. The electro-optic polymer fiber of claim 8, wherein the electrode group operates in a capacitive mode to apply voltage to the core to induce a phase-shift of light passing through the core.

10. The electro-optic fiber of claim 8, wherein the additional electrode group operates in a resistive mode to generate heat as current is passed through the additional electrode group.

11. The electro-optic polymer fiber of claim 8, wherein the electrode group operates in a capacitive mode to apply voltage to the core to induce a phase-shift of light passing through the core, and
wherein the additional electrode group operate in a resistive mode to generate heat as current is passed through the additional electrode group.

12. The electro-optic fiber of claim 11 further comprising a feedback system, the feedback system including
a measurement sensor positioned to measure light outputted from the core, and
a control system operable to independently control the voltage change between electrode group and the current passing through the additional electrode group.

13. The electro-optic fiber of claim 9, wherein the feedback system is automated such that if measurable characteristics of the outputted light fall below a minimal threshold, then the feedback system automatically adjusts the voltage in the electrode group and/or the current in the additional electrode group in order to improve the characteristics of the outputted light.

14. The electro-optic fiber of claim 13, wherein the measurable characteristics of the outputted light include the intensity of the light as a measure of the phase shift that manifests itself through light interference.

15. The electro-optic fiber of claim 1 further comprising a feedback system, the feedback system including
a measurement sensor positioned to measure light outputted from the core,
a measurement sensor positioned to measure light outputted from the core, and
a control system operable to independently control the voltage drop between the electrode group and the current passing through the additional electrode group.

16. The electro-optic fiber of claim 15, wherein the feedback system is automated such that if measurable characteristics of the outputted light fall below a minimal threshold, then the feedback system automatically adjusts the voltage in the electrode group and/or the current in the additional electrode group in order to improve the characteristics of the outputted light.

17. A method of controlling optical signals in an electro-optic fiber, the fiber including a core for passing the optical signal there through, an electrode group having at least one electrode, and an additional electrode group having at least one additional electrode, the method of controlling comprising:
- adjusting voltage through the electrode group in order to adjust an electrical field for poling; and
- varying current through the additional electrode group in order to create localized heating in the fiber.

18. A method of automatically calibrating optical signals passing through an electro-optic fiber, an electrode group having at least one electrode, and an additional electrode group having at least one additional electrode, the method of calibrating comprising:
- measuring characteristics of the outputted light; and
- if the characteristics of the outputted light are below a minimum level, then performing at least one adjustment of
- adjusting voltage through the electrode group in order to adjust an electrical field for poling, or
- varying current through the additional electrode group in order to create localized heating in the fiber.

* * * * *